Feb. 21, 1950     A. L. TROTTER     2,498,146
REMOVABLE FLOOR UNIT FOR TRANSPORTING EQUIPMENT
Filed Aug. 14, 1947     2 Sheets-Sheet 2
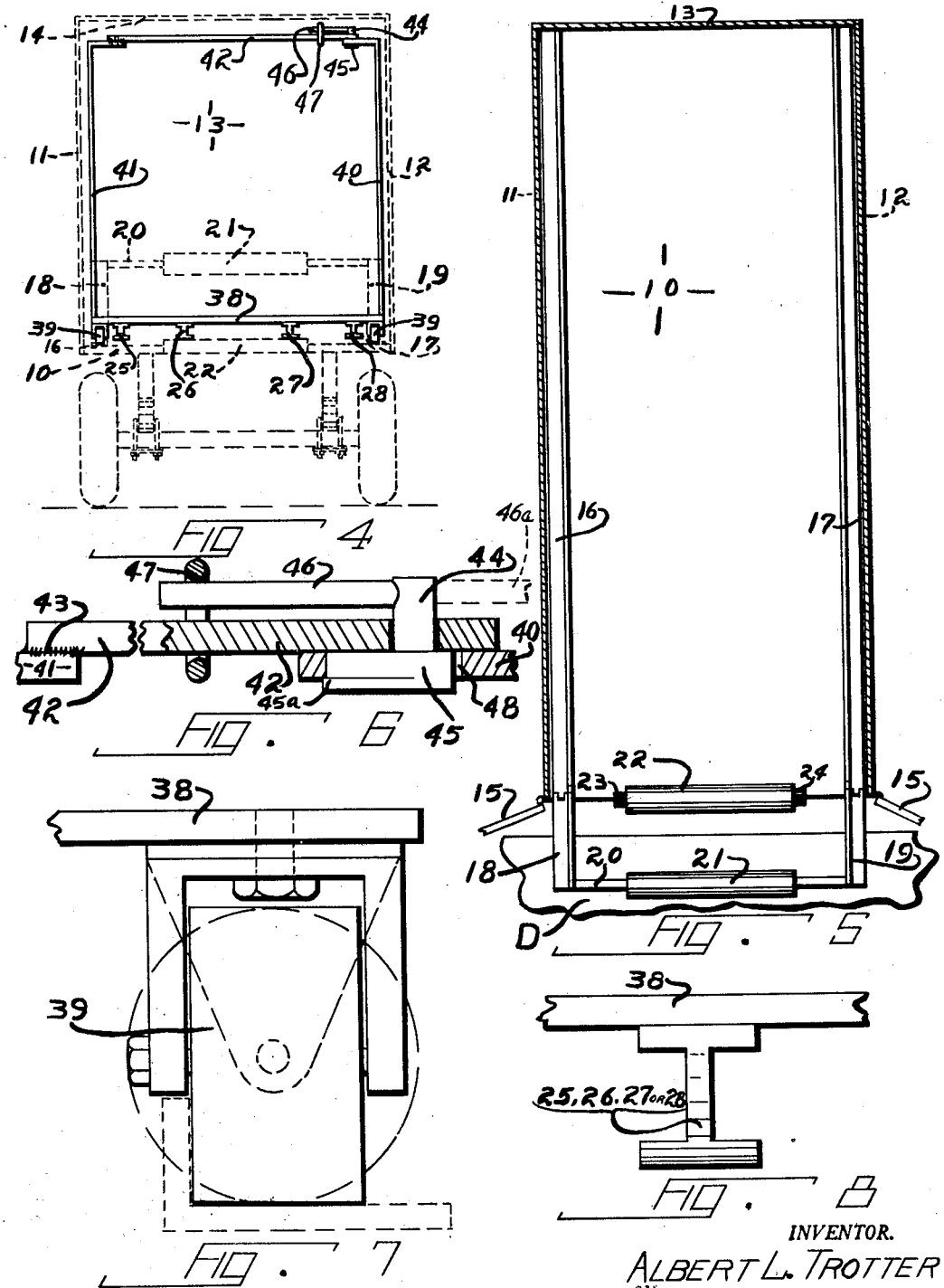
INVENTOR.
ALBERT L. TROTTER
BY M. Y. Charles
ATTORNEY.

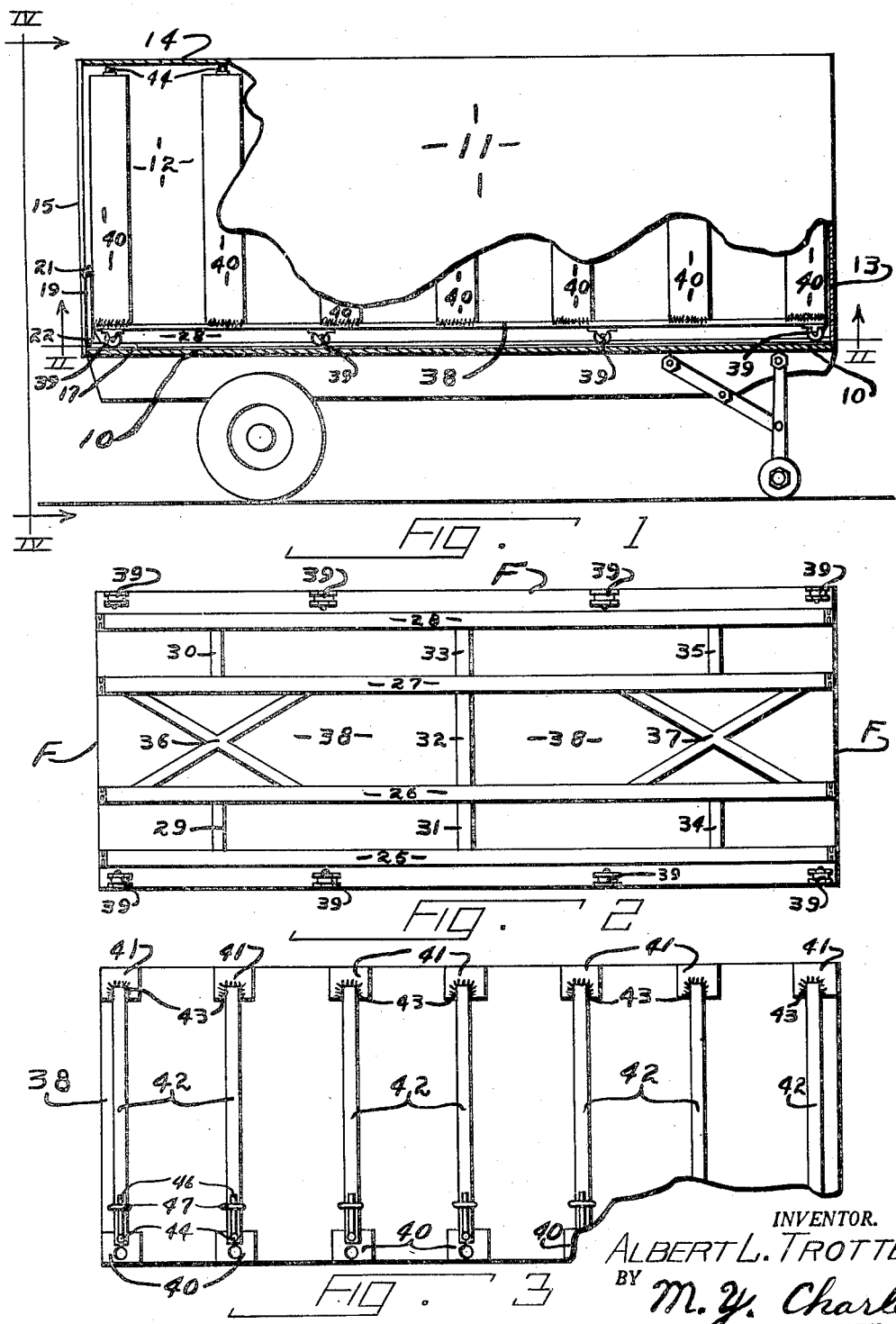

Patented Feb. 21, 1950

2,498,146

UNITED STATES PATENT OFFICE 2,498,146

REMOVABLE FLOOR UNIT FOR TRANSPORTING EQUIPMENT

Albert L. Trotter, Wichita, Kans.

Application August 14, 1947, Serial No. 768,581

1 Claim. (Cl. 214—84)

My invention relates to an improvement in removable floors in transporting equipment, such as trucks, trailers and the like.

In using such equipment, the freight, such as boxes, cases, packages and the like are packed in variable sized and shaped containers and in packing the freight in trucks or trailers, it is desirable to pack them, one against the other so as to make a solid packing of the load from side to side and from end to end and from bottom to top of the conveyance in which they are packed. This takes considerable time and it also takes considerable time to unpack the load at its destination, and of course, during all this time the conveyance is out of travelling use.

Further, it often happens that it is desirable to remove packages that are in inaccessible places in the conveyance and much of the load will have to be unloaded to get to the desired package and then the load will have to be reloaded. This of course constitutes a further loss of time on the conveyance and all this decreases the earning capacity of the conveyance.

In view of the foregoing described losses, I have provided my improved removable conveyance floor device. The object of this device is to provide a conveyance floor that can be removed from the conveyance and set on a freight dock for loading or unloading purposes and replaced with another duplicate removable floor, whereby the conveyance can be kept substantially in continuous travel without the loss of time now consumed in loading and unloading. These and other objects will be more fully explained as this description progresses.

Now referring to the accompanying drawings in which similar numerals of reference designate the same parts throughout the several figures of the drawings:

Fig. 1 is a side view of a semi-trailer body, parts of which are broken away for convenience of illustration.

Fig. 2 is a detail sectional view through the semi-trailer body, the view being as seen from the line II—II in Fig. 1, and looking in the direction of the arrows.

Fig. 3 is a top plan view of the removable floor device. Fig. 4 is a rear view of the removable floor device and illustrates its position in the semi-trailer which is shown in dotted lines.

Fig. 5 is a sectional view through the trailer body and looking in a downward direction and showing the track device therein for receiving the removable floor device.

Fig. 6 is an enlarged detail sectional view through the tightening device for the side retainer units of the removable floor device.

Fig. 7 is an enlarged detail view of the roller device for the support of the removable floor.

Fig. 8 is a fragmentary detail view of the beam structure of the removable floor device.

In the drawings is shown a conventional semi-trailer having a floor 10, sidewalls 11 and 12, front end wall 13, top 14 and rear end gate or doors 15 as usual.

In the trailer is a pair of angle iron track elements 16 and 17 that extend the full length of the semi-trailer body and are rigidly attached to the floor 10, one along each side of the floor 10 and adjacent the walls 11 and 12.

The track elements 16 and 17 are provided with extension track elements 18 and 19, one end of which is hingedly attached to the rear ends of their respective track elements 16 and 17. Between the outer ends of the track extensions 18 and 19 is a shaft 20 on which is revolvably mounted a roller 21 that is centrally positioned on the shaft 20, the ends of the shaft 20 being rigidly attached, preferably by welding, to their respective track extension elements 18 and 19. At the rear end of the trailer floor 10 is a second roller 22 that is revolvably carried on bearings 23 and 24 that are supported on the trailer floor 10 as the understructure therefor.

The removable floor consists of a rigid framework having four longitudinally disposed and parallel beam elements 25, 26, 27 and 28 that are rigidly held in their relative positions by cross members 29, 30, 31, 32, 33, 34 and 35 and cross braces 36 and 37 that are fitted therebetween and are welded thereto to form a rigid floor supporting frame on which the floor 38 is igidly attached and supported thereon to form the removable floor element F. Caster wheels 39 that are mounted on the underside of, and along the frame elements 25 and 28 in such position that they will be received and roll on the track elements 16 and 17 and 18 and 19.

The floor unit F is provided with a series of upwardly extending postlike or strap elements 40 and 41 that extend upwardly along and from the floor unit F, the lower ends of the strap elements 40 and 41 being rigidly attached by bolts, rivets, or welding to the side beams 25 and 28 of the removable floor unit F.

The upper end of each strap 41 is provided with a tie strap 42, one end of which is attached thereto as indicated at 43. The attachment 43, as shown in the drawings is a weld, although it could be a hinge or any other suitable or desired form of attachment. In the other end of the strap 42 is revolvably mounted a pin 44 on the lower end of which is integrally formed a cam element 45 having a lip element 45a formed on the bottom thereof.

The pin 44 is provided with a laterally extending handle element 46 by which the pin 44 and cam 45 may be turned. The outer end of the handle 46 is receivable in a loop element 47 that may be slipped along the strap 42 and off of or over the end of the handle element 46 as a means for holding the handle element 46 in its adjusted position for reasons that will later be made obvious. The cam 45 is receivable in a hold 48 in the upper turned end of the side straps 40. The object of this arrangement is that by turning the handle 46 to the dotted position 46a the cam 45 will be revolved to move the upper ends of the straps 40 and 41 away from each other, whereupon the load may be placed on the floor 38, after which the handle 46 may be returned to the position shown in full lines in Fig. 6, whereupon the upper ends of the straps 40 and 41 will be drawn toward each other to tightly bind the load supported on the floor 38, therebetween to minimize the movement or rubbing of one package against the other that would be created from the shaking of the load as the trailer travels along the highway. The lip 45a prevents the cam 45 from being dislodged or separated from the element 40 while the device is in its bound position as shown in Fig. 6.

The operation of the device is as follows. The trailer may be backed up to a dock D, whereupon the end gate or doors 15 may be opened and the track extension element 18, 19, 20 and 21 may be swung downwardly so that the outer end thereof will rest on the dock D, whereupon the removable floor unit F with the load thereon may be pulled from the trailer body either by hand or a suitable winch or block and tackle onto the floor of the dock D, whereupon the entire load has been removed from the semi-trailer and another duplicate removable floor unit G that is loaded may be pushed into the semi-trailer and the track extension element 18, 19, 20 and 21 may be rocked upwardly against the end of the removable floor unit F and the tail gate or doors 15 may be closed and the trailer is then ready to travel; thus it is obvious that the semi-trailer has been unloaded and reloaded in a much shorter period of time than was possible to load or unload the semi-trailer by the present day methods, therefore it is possible to have the semi-trailer in transit much more of the time than is now possible, therefore it is possible to move much more freight or merchandise with one semi-trailer in the same length of time than it is possible to do with the present day methods, therefore the revenue produced from a semi-trailer in which my invention is employed is very much increased over those of the present day type.

While there are numerous materials from which the removable floor unit F can be made, it would be my idea to build it out of aluminum or some such light weight material that would keep down the freight being hauled.

Due to the fact that all docks D are not the same height it is obvious that the track extension unit 18, 19, 20 and 21 when resting on the dock D would slope either up or down as the case may be if the track extension sloped downwardly, the floor unit F in being removed from the semi-trailer would have a tendency to strike the end of the trailer floor 10 and in this case the longitudinal beams 26 and 27 would rest on the roller 22 and therefore little or no resistance would be offered in pulling the removable floor unit F from the semi-trailer.

Now if the track extension 18, 19, 21 and 20 would slope up instead of down, the beams 26 and 27 of the removable floor unit F would rest on the roller 21 and again little or no resistance to the movement of the removable floor F would be offered.

While the device as shown and described is probably the preferable form and design of the device, it is to be understood that such modifications may be employed as lie within the scope of the appended claims without departing from the spirit and intention of the invention.

Now having fully shown and described my invention, what I claim is:

In a removable floor device for transporting equipment; a track and track extension carried by said equipment, a removable floor unit, said unit having a rigid frame and floor thereon that substantially covers the floor area of said equipment, said unit having rollers thereon, said rollers being receivable by and rollable on said track and track extension, and roller means carried by said equipment and track extension means for engaging said removable floor unit, said removable floor unit having upwardly extending elements along the sides thereof and means for tying the upper ends of said elements in adjusted positions, said means for tying the upper ends of said vertical elements in adjusted positions being a cross element connecting between the upper ends of said vertical elements, and means carried by said cross members for drawing the upper ends of said vertical members toward each other and retaining them in their drawn together position, said means for drawing the upper ends of the vertical elements toward each other being a cam carried on a pin that is revolvably carried by the said cross member and a handle on said pin for revolving the pin and cam, and means carried by the upper end of one of said vertical elements for receiving the cam for retracting movements as described and means for holding said handle in its adjusted position for the purpose described.

ALBERT L. TROTTER.

REFERENCES CITED

The following references are of record in the file of this patent:

UNITED STATES PATENTS

| Number | Name | Date |
|---|---|---|
| 884,127 | Carroll | Apr. 7, 1908 |
| 1,410,935 | Lazareth | Mar. 28, 1922 |
| 1,581,689 | Perin | Apr. 20, 1926 |
| 1,772,734 | Romine | Aug. 12, 1930 |
| 1,932,955 | Coppinger | Oct. 31, 1933 |
| 2,004,095 | Hankins et al. | June 11, 1935 |
| 2,400,312 | Miller | May 14, 1946 |
| 2,442,549 | Pearlman | June 1, 1948 |